United States Patent [19]
Kawaguchi et al.

[11] Patent Number: 5,647,220
[45] Date of Patent: Jul. 15, 1997

[54] METHOD OF CONTROLLING COOLING IN A VENDING MACHINE AND DEVICE THEREFOR

[75] Inventors: Yoshihiro Kawaguchi; Masayuki Ohno; Yutaka Nishioka, all of Tokyo; Michinobu In, Kawasaki; Hiroyuki Kakiuchi, Kawasaki; Shozo Iwamoto, Kawasaki, all of Japan

[73] Assignees: Tokyo Electric Power, Co. Inc., Tokyo; The Fuji Electric Co., Ltd, Kanagawa, both of Japan

[21] Appl. No.: 605,592

[22] Filed: Feb. 22, 1996

[30] Foreign Application Priority Data

Feb. 23, 1995 [JP] Japan .................... 7-059819

[51] Int. Cl.⁶ .................... G05D 15/00; F25B 41/00
[52] U.S. Cl. .................... 62/89; 62/213; 236/78 B
[58] Field of Search .................... 236/78 B; 62/213, 62/208, 229, 89

[56] References Cited

U.S. PATENT DOCUMENTS 3,381,488  5/1968  Lewis ........................ 62/126
3,691,782  9/1972  Holzer ........................ 236/78 B

*Primary Examiner*—William E. Wayner
*Attorney, Agent, or Firm*—Finnegan, Henderson, Farabow, Garrett & Dunner, L.L.P.

[57] ABSTRACT

Merchandise temperature sensors 16 for detecting merchandise temperatures simultaneously with in-housing temperature sensors 17 for detecting the in-housing air temperature of a merchandise housing are provided in the merchandise housing of a vending machine. Further, the cooling mechanism is controlled by means of the merchandise temperature sensor 16 during the peak shift or peak cut, whereas the cooling mechanism is controlled by means of in-housing temperature sensor 17 during normal operation. Thus the merchandise temperature is directly detected during the peak shift or peak cut where the temperature sharply varies so as to increase merchandise temperature control accuracy. Even when the installation of the merchandise temperature sensors is limited to some columns in view of cost reduction, the cooling mechanism is made controllable by collectively detecting the merchandise temperature in the whole column by means of the in-housing temperature sensors 17 during the normal operation.

10 Claims, 8 Drawing Sheets

FIG. 4A
FIG. 4B
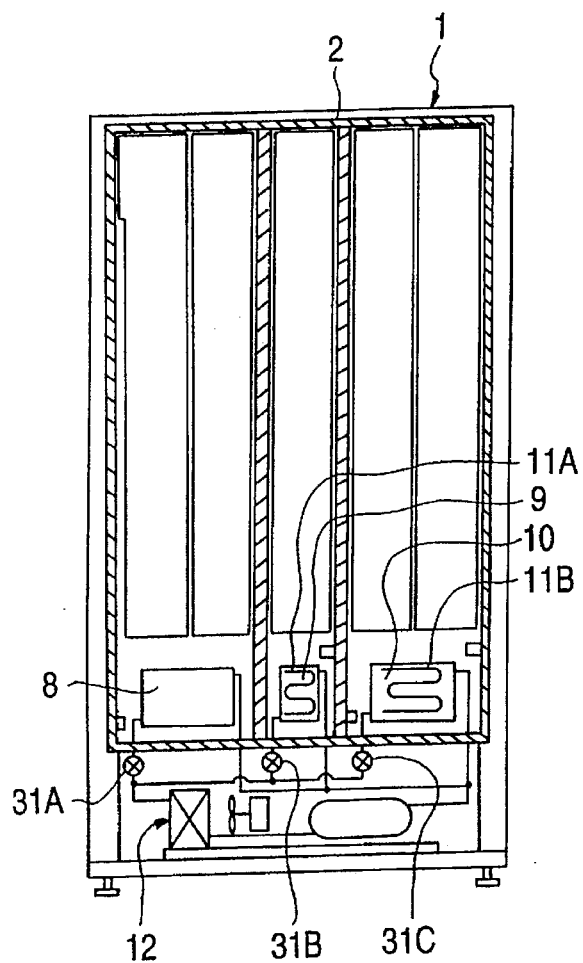
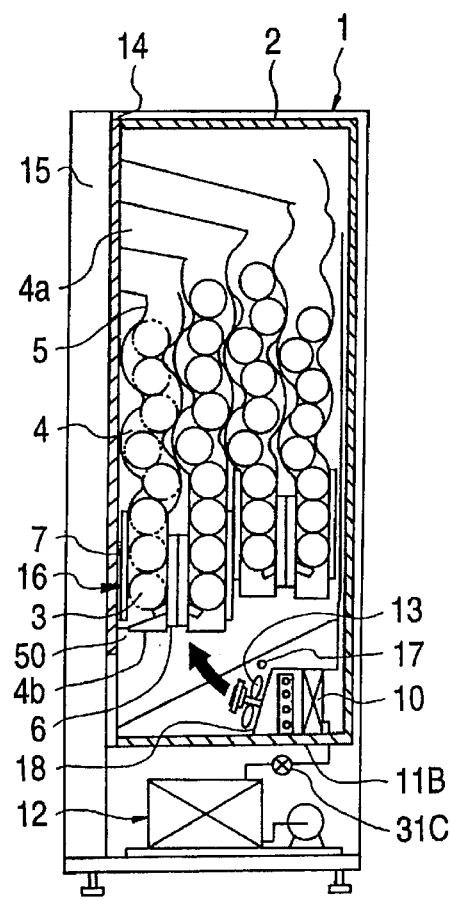

METHOD OF CONTROLLING COOLING IN A VENDING MACHINE AND DEVICE THEREFOR

BACKGROUND OF THE INVENTION

1. Field of the Invention

The present invention relates to a vending machine for selling chiefly canned beverages, bottled beverages or paper-packed beverages, and more particularly to a cooling-control method adapted to cope with the peak of power demand, and a cooling control device using such a method.

2. Description of the Related Art

Excessive power demand in the summer daytime has posed a serious problem and as a link in the chain of countermeasures against such a demand, it has been examined to force the suspension of the cooling operation of vending machines for dispensing cooled canned beverages in a prescribed time zone, that is, a peak cut in the daytime in which power demand is concentrated. Since the suspension of the cooling operation accompanies a rise in the temperature of merchandise, there is the necessity of taking it into consideration to minimize the annoyance of consumers due to a rise in the temperature of merchandise while the peak of power demand is effectively dealt with. For the reason stated above, one of the steps required is to cause normal operation to be restored when the merchandise temperature has reached a predetermined upper limit even in the peak cut time zone.

A vending machine of the sort mentioned above is generally equipped with a cooling mechanism to be on-off controlled by temperature sensors and arranged so as to cool the merchandise accommodated in a merchandise housing by circulating the air cooled by the cooling mechanism through the merchandise housing and discharging articles of merchandise one after another with the forefront one first at the point of sales, the temperature sensors for controlling the cooling mechanism being normally adapted to detect the in-housing air temperature near a cooled air outlet. However, the in-housing air temperature detected by the temperature sensors covers temperatures of merchandise of more than one kind stored in a plurality of sections (hereinafter called the columns) formed in the merchandise housing for various kinds of merchandise. When only a specific column is filled with supplementary merchandise, for example, the temperature detected by the temperature sensors will not rise so much if merchandise temperatures in the other columns are low though the temperature of the supplemented merchandise is extraordinary high. In other words, the in-housing air temperature would not truly reflect the temperature of a extraordinary merchandise in such a specific column. There is therefore the possibility that the peak cut is allowed to continue without the detection of the fact that the merchandise in any one of the columns has reached the upper-limit temperature during the peak cut.

The present inventors previously developed a technique for on-off controlling a cooling mechanism by tightly attaching a temperature sensor to the surface of merchandise within a housing so as to detect the merchandise temperature instantly and the present applicant also applied for a patent (Japanese Patent Unexamined Publication No. Hei 7-29057). As the temperature sensor (merchandise temperature sensor) is capable of detecting the temperature of merchandise itself, temperature control can be exerted more accurately than what has been effected by the conventional method of detecting the in-housing air temperature, and the merchandise temperature in each of the individual columns is made clearly available, so that an excessive rise in the merchandise temperature during the peak cut becomes detectable.

When the peak cut is applied, moreover, the on-off temperature of the cooling mechanism is shifted so that it is made lower than the temperature in the normal time zone for a predetermined time prior to the time zone during the peak cut; the application of the peak shift is preferred in this manner when the merchandise has been cooled down beforehand. Further, the normal operation is caused to be restored when the merchandise temperature conversely begins to become lower during the peak cut because it is necessary to prevent the merchandise from being frozen. Notwithstanding, the detection of the merchandise itself is very effective for antifreeze.

As set forth above, though control of the cooling mechanism for directly detecting the merchandise temperature is advantageous in that control accuracy is high, such a temperature sensor has to be installed in all the columns to make the most of the advantages and the problem is that this arrangement is costly. More specifically, since the in-housing air temperature includes the merchandise temperature in all the columns in the same chamber, only one temperature sensor (in-housing temperature sensor) is normally needed for a plurality of columns. However, the merchandise temperature varies with the column and consequently it is required to provide such a merchandise temperature sensor for each column to take hold of the temperature variations.

A possible method of reducing cost when the cooling mechanism is controlled by detecting the merchandise temperature is to select one or more than one column as representative ones, so that the temperature sensors are installed in only these columns. However, the partial installation of temperature sensors may result in failing to detect the insufficiently cooled condition of supplementary merchandise when the merchandise stored in a column without the temperature sensor happens to have been sold continuously, thus entertaining the fear of allowing the insufficiently cooled merchandise to be directly sold (merchandise situated close to a merchandise carry-out mechanism, that is, articles to be discharged earlier in the carry-out order are selectively cooled normally in a typical vending machine).

SUMMARY OF THE INVENTION

The present invention has been made under the circumstances, and therefore an object of the present invention is to provide a method of controlling the cooling of a vending machine adapted for improving the control accuracy of a cooling mechanism while suppressing cost for temperature detection and precisely dealing with countermeasures against a peak power demand, and a device for controlling the cooling using the above method.

In order to accomplish the object above, a method of controlling the cooling of a vending machine according to the present invention wherein merchandise is cooled by circulating air cooled by a cooling mechanism which is on-off controlled by temperature sensors through a merchandise housing; the merchandise is cooled by shifting the on-off temperature of the cooling mechanism to a level lower than a normal operation level for a predetermined time prior to a peak time zone of power demand under control of a timer (peak shift); and the cooling mechanism is forced to stop for a predetermined time in the peak time zone (peak cut), comprises the steps of:

providing two kinds of temperature sensors including a merchandise temperature sensor for immediately detecting the merchandizing temperature and an in-housing temperature sensor for detecting the air temperature within a merchandise housing, controlling the cooling mechanism with the merchandise temperature sensor during the peak cut or peak shift, and controlling the cooling mechanism with the in-housing temperature sensor during the normal operation.

In the method of controlling the cooling of a vending machine, the peak cut or peak shift is preferably stopped to cause the normal operation to be restored when an inner door covering the front of the merchandise housing has been kept open for a predetermined time during the peak cut or peak shift.

In the method of controlling the cooling of a vending machine, the peak cut or peak shift is preferably stopped to cause the normal operation to be restored when the number of articles of merchandise sold in the whole vending machine has reached a predetermined value during the peak cut or peak shift.

In the method of controlling the cooling of a vending machine, a lower-limit temperature is preferably set to prevent merchandise from being frozen during the peak shift, so that the cooling mechanism is turned off when an in-housing air temperature has reached the lower-limit temperature during the peak shift.

Although the in-housing air temperature sharply drops during the peak shift, the temperature of merchandise varies slowly as its heat capacity is large and there arises time lag against the in-house air. Therefore, it is safer to control the cooling mechanism by detecting the merchandise temperature during the peak shift where the in-housing air temperature greatly varies in view of making the merchandise temperature control accurate and preventing the merchandise from being frozen. Moreover, the cooling mechanism is stopped during the peak cut and the merchandise temperature tends to rise easily due to continuous sales. In addition to the preceding conditions, the in-housing air temperature tends to rise quickly because of the merchandise temperature while the inner door of the merchandise housing is kept open for the purpose of supplementing and inspecting merchandise. It is therefore advisable in this condition to suspend the peak cut when the merchandise temperature has reached the upper limit by detecting the merchandise temperature so as to control the cooling mechanism, and to continue the peak cut while the merchandise temperature is held within the limit even though the in-housing air temperature rises as the inner door is opened.

On the other hand, the cooling mechanism is controlled by detecting the in-housing air temperature shown to include the merchandise temperature in the whole column during the normal operation, so that when it is attempted to reduce cost by decreasing the number of temperature sensors for directly detecting the merchandise temperature, any situation in which the cooling mechanism is left in the off-state despite the presence of high-temperature merchandise resulting from continuous sales and supplemented merchandise since the merchandise temperature is not detected in the columns without the merchandise temperature sensors can thus be avoided. Although the in-housing air temperature is not what faithfully transmits the merchandise temperature in the individual columns as stated above, no extreme column-to-column temperature difference exists during the time the cooling mechanism is steadily operated and these temperatures may collectively be controlled without any problem arising from a vending machine for practical use.

In a case where the merchandise temperature is detected during the peak shift or peak cut and where the in-housing air temperature is detected during the normal operation, though the in-housing air temperature will sharply rise because of the intrusion of the outside air if the inner door covering the front of the merchandise housing is opened during the peak cut or peak shift, the merchandise temperature will not instantly rise due to its heat capacity. When, however, the intrusion of the outside air increases to a certain extent, it takes time to recover the in-housing air temperature after the inner door is closed and there is the possibility that a rise in the merchandise temperature exceeds the upper limit. Consequently, the peak cut or peak shift on the day should preferably be stopped to cause the normal operation to be restored when the inner door has been kept open for more than a predetermined time.

In a case where a number of articles in any column without the merchandise temperature sensor have been sold during the peak shift or peak cut, insufficiently cooled merchandise may be sold if the peak cut is applied. Therefore, the peak cut or peak shift is stopped to cause the normal operation to be restored when the number of articles sold in any column or the number of articles sold in the whole vending machine has reached a predetermined value, whereby the risk of allowing insufficiently cooled merchandise to be sold is reduced.

If antifreeze is attempted only by detecting the merchandise temperature during the peak shift, on the other hand, there is the possibility that frozen merchandise in any column without the merchandise temperature sensor may be overlooked. Therefore, the lower-limit temperature is set in the in-housing air temperature range to prevent the merchandise from being frozen during the peak shift and when the in-housing air temperature lowers up to the lower limit during the peak shift, the cooling mechanism is turned off to ensure that the merchandise in any column without the merchandise temperature sensor is prevented from being frozen.

BRIEF DESCRIPTION OF THE DRAWINGS

The above and other objects and features of the present invention will be more apparent from the following description taken in conjunction with the accompanying drawings.

FIG. 4A is an elevational view showing the vending machine with its inner door kept open;

FIG. 4B is a vertical sectional view showing the vending machine shown in FIG. 4A;

DETAILED DESCRIPTION OF THE PREFERRED EMBODIMENTS

A description will subsequently be given of an embodiment of the present invention in the form of a vending machine for dispensing canned beverages with reference to the accompanying drawings.

Figure 3:
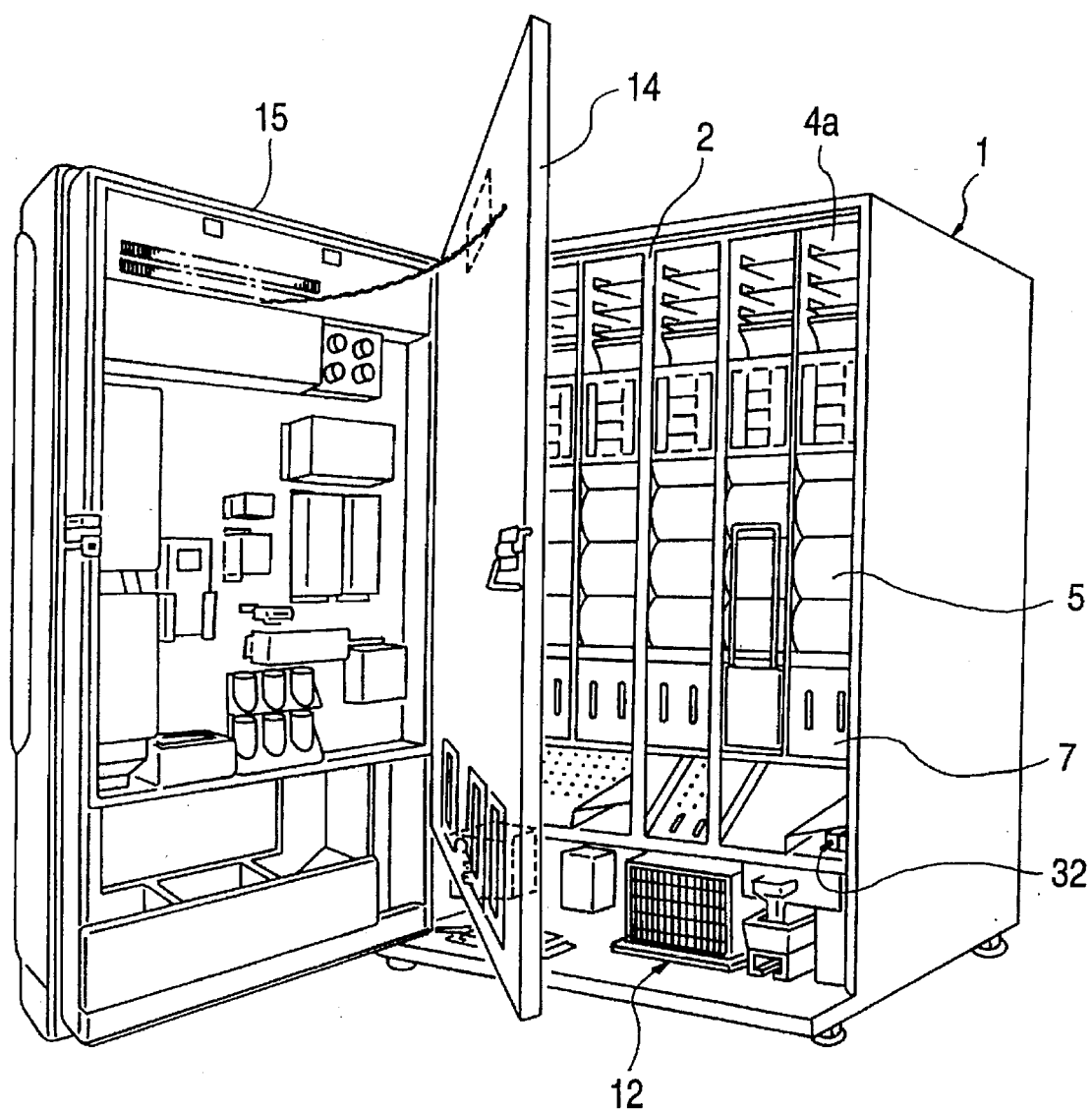
FIG. 3 is a perspective view showing a vending machine with its door kept open according to the present invention.
Figure 5A:
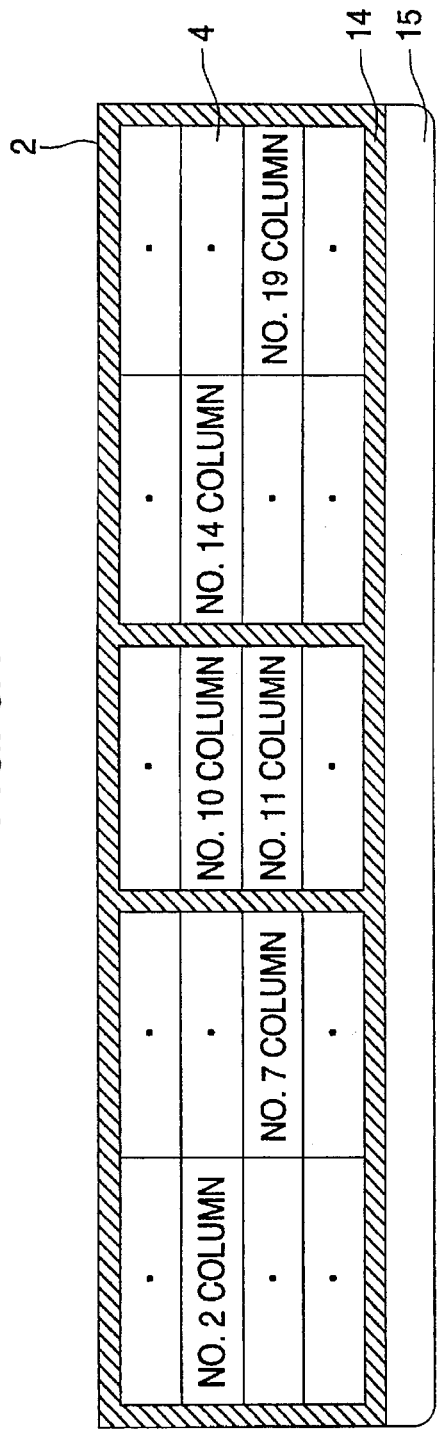
FIGS. 5A and 5B are transverse sectional views showing an arrangement of columns in the vending machine of FIG. 3, respectively.

In the vending machine of FIGS. 3 and 4 first, a merchandise housing 2 made of thermal insulating material with the opened front is installed in a body 1 and laterally partitioned into three chambers. Serpentine-type bent racks 5, so to speak, for storing a number of cylindrical cans for airtightly containing beverages as merchandise 3 set sideways in merchandise passages 4 meandering vertically are accommodated in the respective chambers of the merchandise housing 2 as shown in FIG. 4B. Further, as shown in FIG. 4B, each bent rack 5 is so constructed as to have a four-fold merchandise passage 4 (columns in this example) formed longitudinally and there are installed bent racks 5 in five rows in total; namely, at a rate of two to one and to two rows in the respective chambers of the merchandise housing 2. As shown in FIG. 5, the merchandise passages (columns) 4 in the merchandise housing 2 are horizontally arranged and there are 20 columns (No. 1-No. 20) in total. As is well known, the merchandise 3 thrown in from each merchandise inlet 4a is retained by a merchandise carry-out mechanism 6 in a merchandise carry-out passage 4b in the lower portion of the merchandise passage 4 before being piled up vertically. When the merchandise 3 is sold, it is set free from being retained and successively carried out one piece at a time with the lowermost one first. A passage regulating plate 7 for regulating the passage width is installed opposite to the merchandise carry-out mechanism 6 in the merchandise carry-out passage 4b.

The merchandise housing 2 shown in FIG. 4A includes a left chamber specifically used for cold storage, a central and a right chamber used for cold simultaneously with hot storage. The left chamber is equipped with a cooler 8; the central chamber with both a cooler 9 and a heater 11A; and the right chamber with both a cooler 10 and a heater 11B. A refrigeration unit 12 for supplying a refrigerant to the coolers 8-10 is situated in a machine house in the lower portion of the merchandise housing 2. As shown in FIG. 4B, moreover, a fan 13 is installed in each chamber above and the air cooled by the coolers 8-10 or what is heated by the heaters 11A, 11B in the housing is circulated from the lower part to the upper one as shown by arrows, so that the merchandise 3 in the merchandise carry-out passage 4b is cooled or heated selectively.

A cooling mechanism (the coolers 8-10, the refrigeration unit 12, etc.) and the heaters 11A and 11B are on-off controlled by temperature sensors 16, 17 with thermistors. In this case, the temperature sensor 16 is a merchandise temperature sensor fitted to the passage regulating plate 7 and used for detecting the surface temperature of the merchandise 3 located in the lowermost portion of the merchandise carry-out passage 4b. Whereas the temperature sensor 17 is an in-housing sensor used for detecting an in-housing air temperature and fitted to the front of a duct 18 surrounding each of the coolers 8-10 and each of the heaters 11A, 11B. Incidentally, the front of the merchandise housing 2 is normally closed with an inner door 14 made of thermal insulating material, whereas the front of the body 1 is closed with an outer door 15 outside the inner door 14.

Figure 5B:
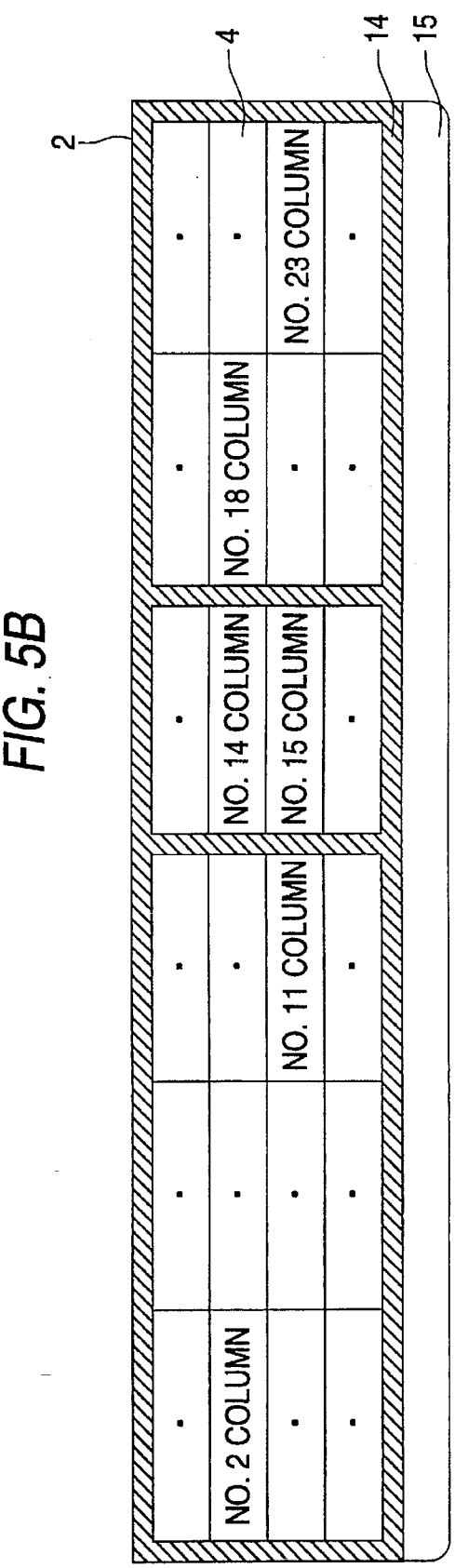
Figure 6:
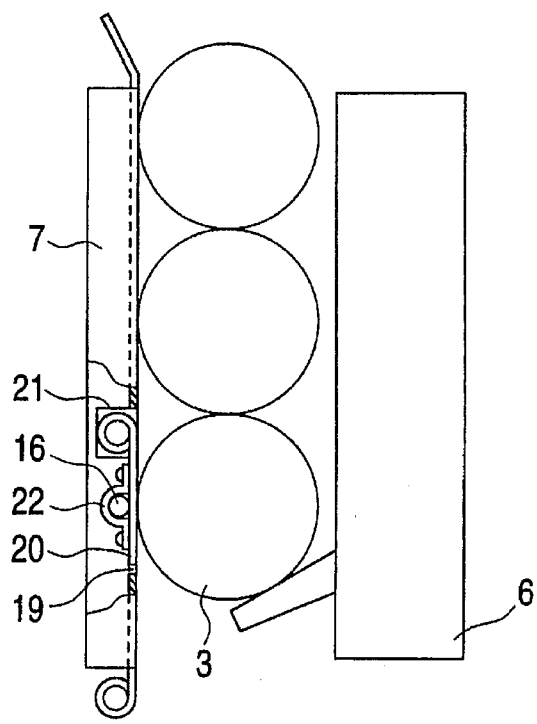
FIG. 6 is a side view showing the fitting structure of a merchandise temperature sensor in the vending machine of FIG. 3.
Figure 7:
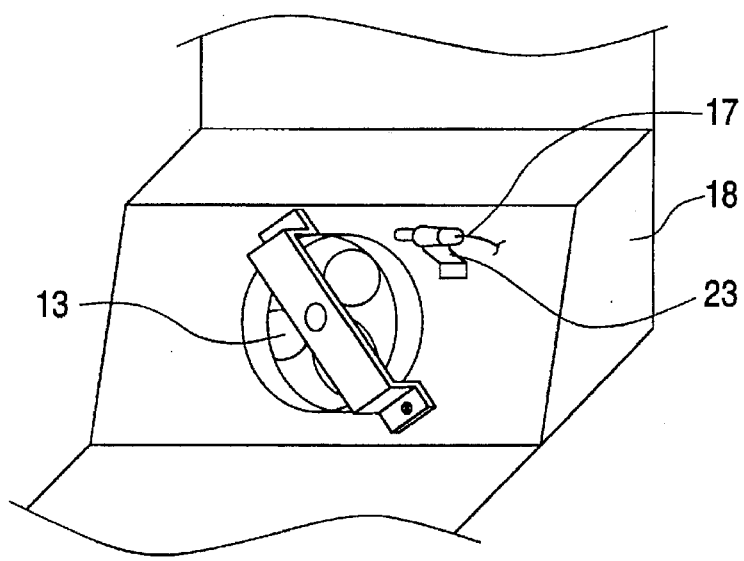
FIG. 7 is a perspective view showing the fitting structure of an in-housing temperature sensor.
Figure 8:
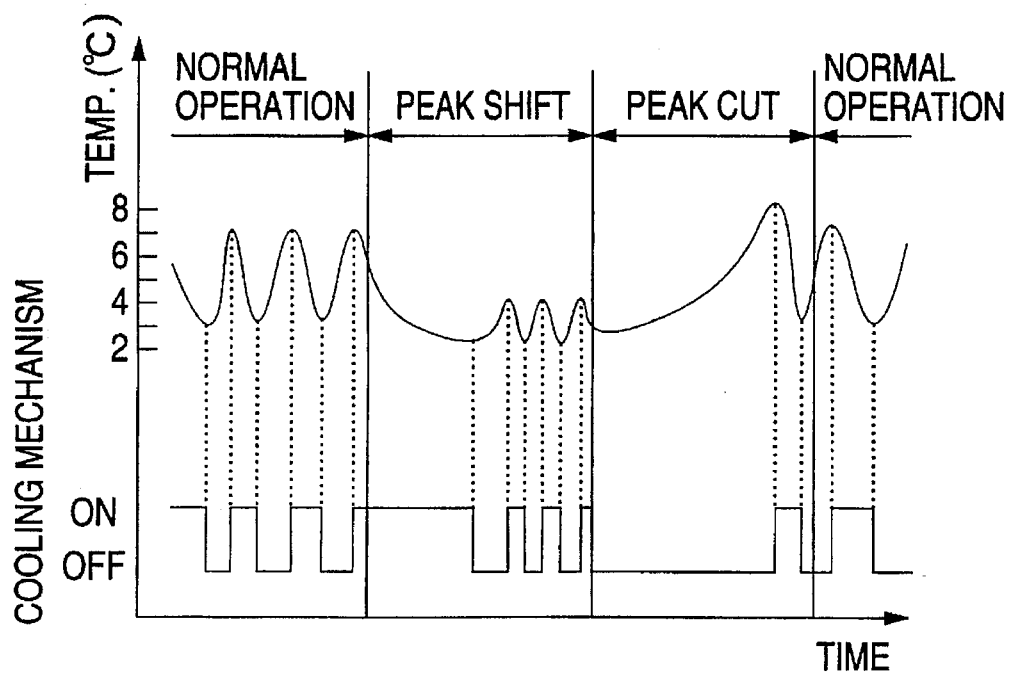
FIG. 8 is a chart showing temperature Control effected by the merchandise temperature sensor.

FIGS. 6 and 7 show the fitting structure of the merchandise temperature sensor 16 and that of the in-housing temperature sensor 17. In FIG. 6, first, a window hole 19 is bored in a portion of the passage regulating plate 7 in contact with the merchandise 3, and the upper end of a heat transfer flapper 20 formed with a square plate facing the window hole 19 is supported with the passage regulating plate 7 in such a manner that it is rotatably suspended by a shaft 21. The cylindrical merchandise temperature sensor 16 is joined and secured with a fitting metal 22 to the backside of the heat transfer flapper 20. As it is difficult to provide all the columns with the merchandise temperature sensor 16 in view of cost, such a merchandise temperature sensor 16 is provided for each of the columns No. 2 and No. 7 in the left chamber, No. 14 and No. 19 in the right chamber, for example, in FIG. 5A. The heat transfer flapper 20 is formed of metal material offering excellent heat conductivity and pressed against the merchandise 3 by a torsion spring (not shown) fitted to the shaft 21 so as to transmit the heat generated to the merchandise temperature sensor 16. In FIG. 7, on the other hand, the in-housing temperature sensor 17 is held near the fan 13 fitted to the front of the duct 18 via a support metal 23 in such a way as to protrude forward. One in-housing temperature sensor 17 may be provided for each chamber. The total number of columns is not limited to 20, and for example, it may be 24 columns (No. 1-No. 24) as shown in FIG. 5B. Also, the merchandise temperature sensors 16 are disposed two or more within each column, but are not disposed in the columns at a front portion and corner portions in order to prevent the merchandise temperature sensors 16 from being adversely affected by disturbance. Further, the merchandise temperature sensors 16 are preferably disposed in the columns in a diagonal line (front and rear, right and left, etc.) to make the merchandise temperature sensors 16 in each column apart from each other.

Figure 1:
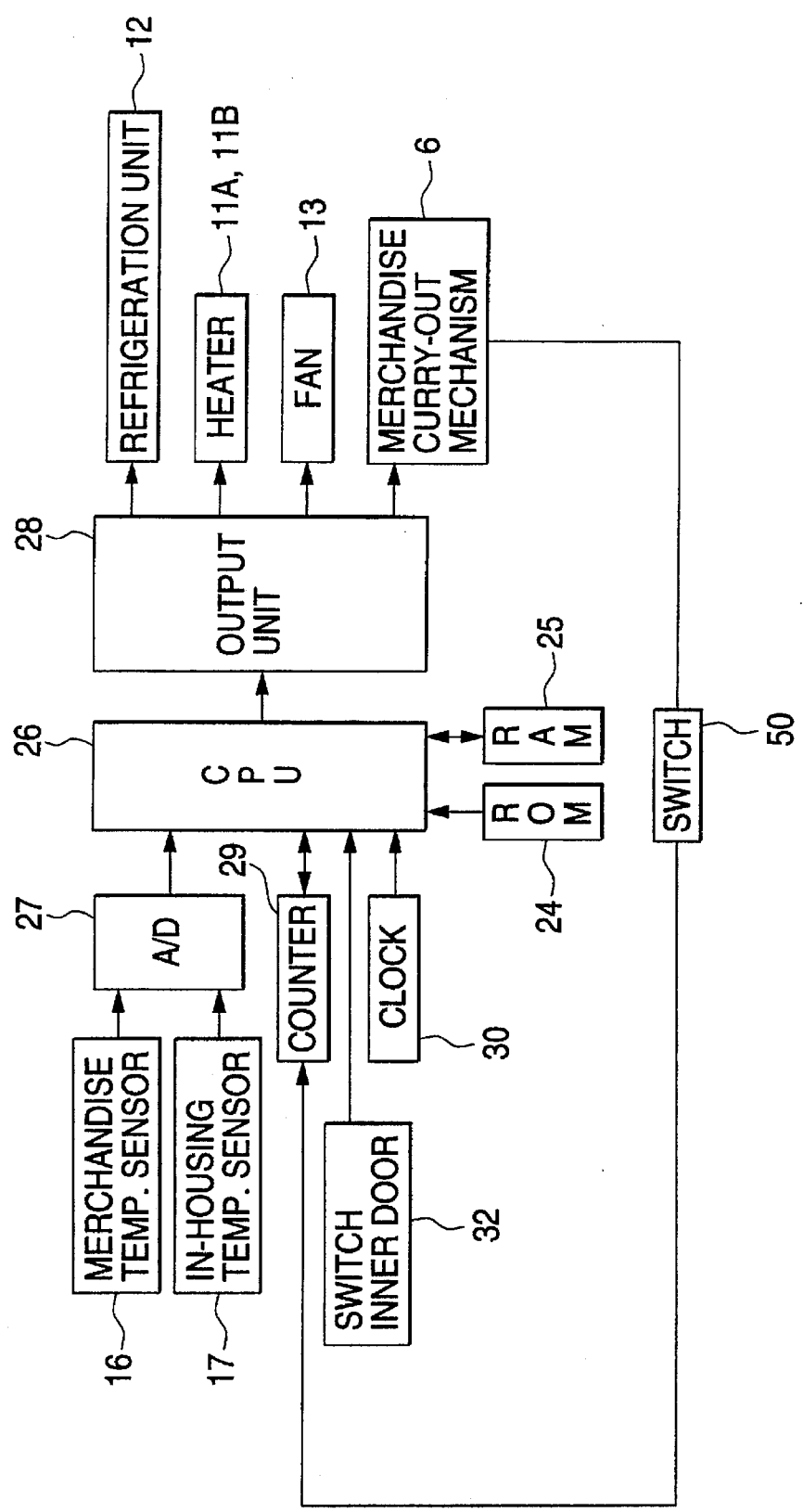
FIG. 1 is a block diagram of a control apparatus embodying the present invention.

FIG. 1 is a schematic block diagram illustrating the constitution of a control apparatus of the aforesaid vending machine. In FIG. 1, CPU 26 for controlling each component according to programs stored in ROM 24 and control data stored in RAM 25 controls the heaters 11A, 11B, the refrigeration unit 12, the fans 13, the merchandise carry-out mechanism 6 and the like via an output unit 28 on receipt of temperature signals from the merchandise temperature sensors 16 and the in-housing temperature sensors 17 via an A/D converter 27. Further, the CPU 26 is provided with a counter 29 for counting the number of articles sold and the time during which the inner door 14 is kept open and a clock 30 for timing the present time. An inner door switch 32 that detects the open/close state of the inner door 14 is connected to the CPU 26. A switch 50 that detects a merchandise carry-out signal is disposed in the merchandise carry-out mechanism 6.

Figure 2A:
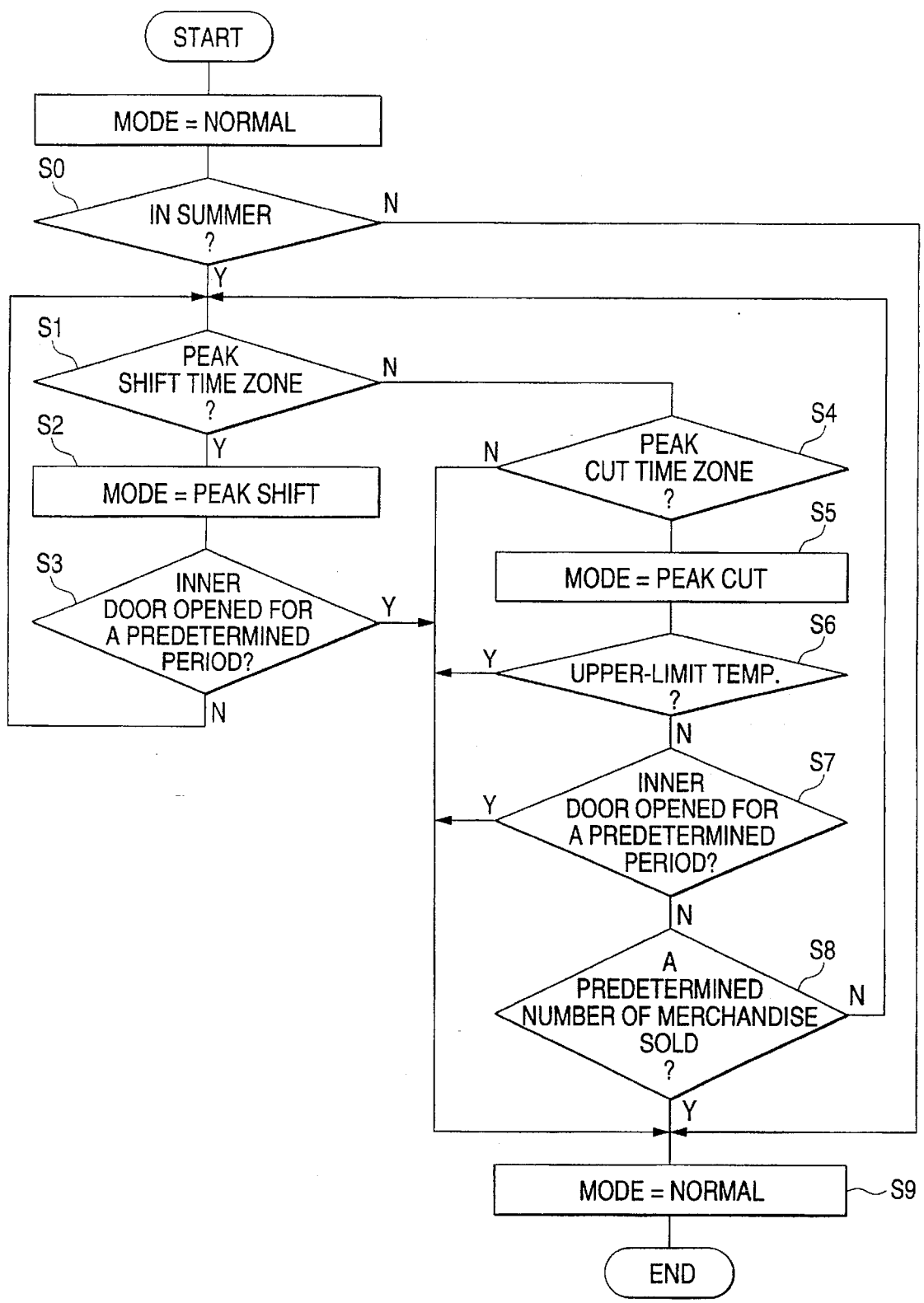
FIGS. 2A and 2B are flowcharts showing a control operation according to the present invention.
Figure 2B:
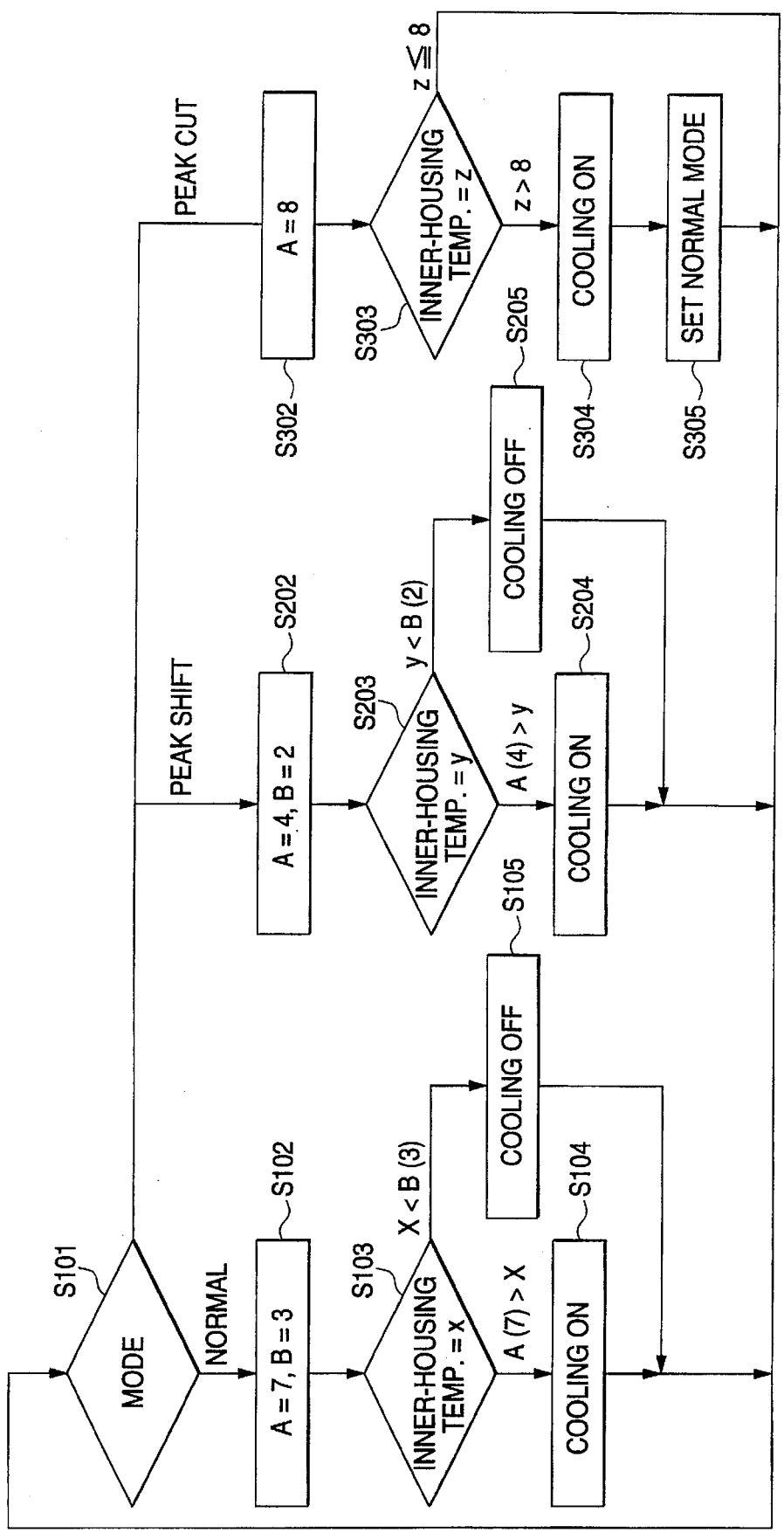

A description will subsequently be given of the control operation of the control apparatus of FIG. 1 during the cooling operation in summer by referent to a flowchart of FIGS. 2A and 2B. It should be noted that the cooling operation means that the cooling mechanism and the fan are operated.

The CPU 26 first checks according to a calendar installed therein whether the present season is summer or not (Step S0). If it is in summer, the CPU 26 then checks according to time data from the clock 30 whether the present time is in a peak shift mode (e.g. a peak shift time zone is 10.00-13.00 hours) (Step S1) and causes normal operation to continue provided it is before the peak shift mode by turning on-off the cooling mechanism in response to the temperature detected by the in-housing temperature sensor 17. More specifically, referring to FIG. 2B, in the case where the CPU 26 sets an operation mode to a normal operation according to the present time (Step S101), on the assumption that the target merchandise temperature is set to, for example, 5° C., a temperature A at which the cooling mechanism is turned on is set to, for example, 7° C., whereas a temperature B at which it is turned off is set to 3° C. (Step S102). When it is turned on (Step S103) when the temperature x detected by the in-housing temperature sensor 17 rises up to 7° C. (S103), but turned off (Step S105) when the temperature detected thereby lowers up to 3° C. (Step S104). This cycle is repeated accordingly.

When the present time is in the peak shift mode at Step S1, the peak shift is applied (Step S2) so that the merchandise 3 is cooled further by shifting the temperatures at the on- and off-points of the cooling mechanism down the temperature during the normal operation and with the target merchandise temperature set at the 5° C. during the normal operation, the actual merchandise temperature is lowered by 2° C. to 3° C., for example. During the peak shift, however, the cooling mechanism is to be controlled at the temperature detected by the merchandise temperature sensor 16 and with the temperatures A and B of the on- and off-points of the cooling mechanism set at 4° C. and 2° C., respectively (Step S202), for example, the cooling mechanism is turned on (Step S204) when the temperature detected by the merchandise temperature sensor 16 rises up to 4° C. (S 203) and turned off (Step S205) when the temperature detected thereby lowers up to 2° C. (Step S203). This cycle is repeated accordingly.

Since a plurality (two) of merchandise temperature sensors 16 are installed in one chamber in that case, a mean value of the temperatures detected by these merchandise temperature sensors 16 is used to control the cooling mechanism. However, the cooling mechanism may be turned on or off immediately after any one of the temperatures detected by the merchandise temperature sensors 16 has reached the on- or off-point. According to this embodiment of the invention, moreover, one refrigeration unit 12 is provided for common use for the three coolers 8–10 as shown in FIG. 4(A), and a refrigerant is distributed from a distributor (not shown) via electromagnetic valves 31A–31C to the respective coolers 8–10. When the temperature detected in any one of the merchandise temperature sensors 16 reaches the off-point, the corresponding electromagnetic valves 31A–31C are closed and when the temperatures detected in all the chambers reach the off-point, the operation of the refrigeration unit 12 is stopped.

Figure 9:
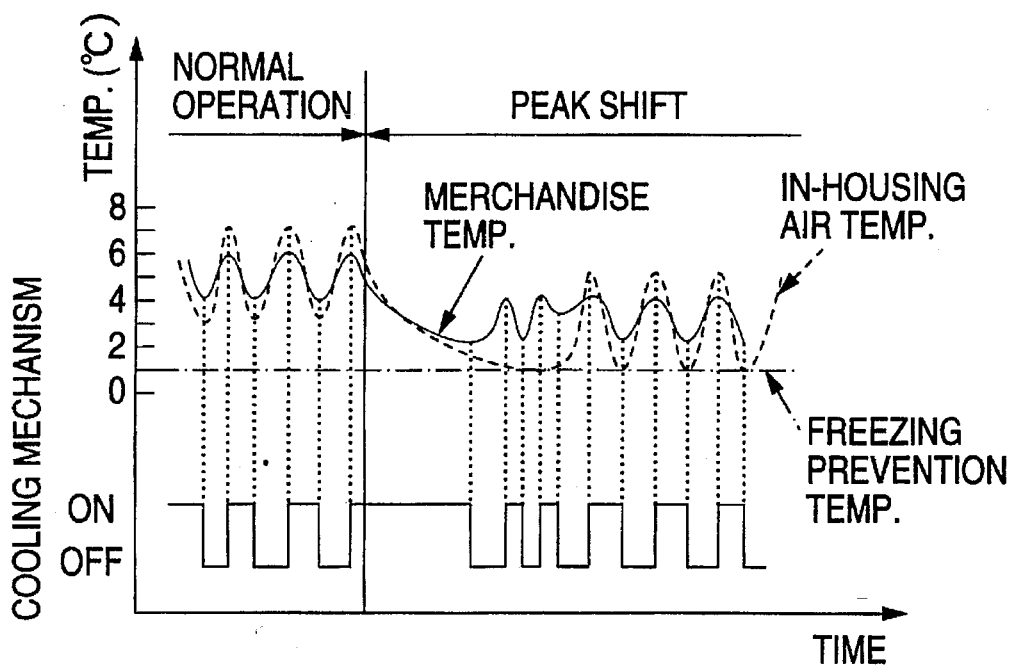
FIG. 9 is a chart showing antifreeze control effected by the in-housing temperature sensor.

The merchandise temperature in each chamber within the merchandise housing 2 slightly varies. Consequently, the cooling mechanism is turned off even though the temperature detected by the merchandise temperature sensor 16 has not reached the off-point when the temperature detected by the in-housing temperature sensor 17 as shown by a broken line in FIG. 9 lowers up to an antifreeze temperature, for example, 1° C. so as to prevent freezing because the merchandise temperature in any column without the merchandise temperature sensor 16 lowers too much. Control by means of the merchandise temperature sensor 16 is restored thereafter.

The body 1 is provided with an inner door switch 32 (FIG. 3) for detecting the opening and closing of the inner door 14, so that it is checked whether the inner door 14 has been kept open for a predetermined time, for example, three minutes, by letting the counter 29 count the time during which the inner door 14 is kept open during the peak shift (Step S3). The inner door 14 is opened when merchandise is supplemented or when the necessity of supplementing merchandise is verified. Although the in-housing temperature is restored to the original condition soon as it takes about 10 seconds only to verify such necessity as stated above, it normally takes over three minutes to supplement merchandise. In the latter case, a large quantity of air flows into the housing and the in-housing temperature instantly rises and the merchandise temperature is beginning to rise before long, though it is kept from rising immediately. When the inner door 14 has been kept open for a predetermined time, the peak shift • peak cut on that day is discontinued and the normal operation is restored (Step S9).

After the termination of the peak shift mode (NO at Step S1), the CPU 26 checks whether the present time is in the peak cut mode (e.g., the peak cut time zone is 13.00–16.00 hours) (Step S4) and if it is in the peak cut mode, the peak cut, that is, the operation of the refrigeration unit 12 and the fan 13 are completely stopped (Step S5). However, it is checked whether the temperature z detected by the merchandise temperature sensor 16 has reached the preset upper-limit temperature (Step S302), for example, 8° C. even during the peak cut (Step S6 in FIG. 2A and Step S303 in FIG. 2B). When the upper-limit temperature has been reached, the peak cut is stopped and the normal operation of the machine is caused to be restored (Step S9 in FIG. 2A and Step S304 in FIG. 2B). When the inner door 14 has been kept open for a predetermined time (e.g., 3 min.) as during the peak shift (YES at Step S7), the normal operation of the machine is caused to be restored.

When the peak cut is entered, further, the counter 29 is actuated to count the number of articles sold by detecting merchandise carry-out signals from a switch 50 disposed in the merchandise carry-out mechanism 6 so as to check whether it has reached a predetermined value (Step S8) and the normal operation of the machine is caused to be restored (Step S9). As shown in FIG. 4(B), the merchandise 3 in each column is such that the articles located in the lower portion of the merchandise passage 4 (within the merchandise carry-out passage 4b) are selectively cooled and that the merchandise temperature is increased as it is positioned higher. Consequently, there is the possibility that after the cooled merchandise in the lower portion have been sold, insufficiently cooled one may be carried out. Therefore, the peak cut is stopped when a predetermined number of articles, for example, four of them in any column have been sold during the peak cut so as to prevent those extremely insufficiently cooled from being sold. It is also possible to stop the peak cut in a case where a predetermined number of articles of merchandise 3, for example, 10 of them, in the vending machine as a whole have been sold in place of or in addition to the case where a predetermined number of them in each column have been sold.

As was described above, according to the present invention, highly precise control can be exerted without detecting the merchandise temperature. However, with the provision of the merchandise temperature sensors which may incur an increase in cost if they installed in the whole column simultaneously with the in-housing temperature sensor allowing the merchandise temperature in the whole column to be detected collectively and less costly, the cooling mechanism is controlled with the merchandise temperature sensor during the peak cut or peak shift and controlled with the in-housing temperature sensor during the normal operation, whereby the merchandise temperature during the peak shift where the in-housing air temperature sharply drops is precisely controlled so as to effectively prevent the merchandise from being frozen while desired cooling is accomplished. During the peak cut where the cooling mechanism is stopped, the peak cut is continued until the merchandise temperature having a time lag in the temperature rise rises as high as possible even when the in-housing air temperature sharply rises as the inner door is opened for the purpose of supplementing and inspecting the merchandise to increase the effectiveness of countermeasures against the peak power demand. While the number of merchandise temperature sensors is decreased to reduce the cost, moreover, the merchandise temperature in the whole column is made collectively controllable by detecting the in-housing air temperature during the normal operation.

When the inner door covering the front of the merchandise housing has been kept open for a predetermined time or when the number of articles sold in any column or the whole vending machine has reached a predetermined value during the peak cut or peak shift, the peak cut or peak shift on the day is stopped to cause the normal operation to be restored, whereby some restriction can be imposed on the sale of insufficiently cooled merchandise. Further, the lower limit for preventing the merchandise from being frozen during the peak shift is set and the cooling mechanism is turned off when the in-housing air temperature lowers up to the lower-limit temperature to ensure that the merchandise in any column without the merchandise temperature sensor is prevented from being frozen.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A method of controlling the cooling of merchandise in a vending machine wherein merchandise is cooled by circulating air cooled by a cooling mechanism which is on-off controlled by temperature sensors through a merchandise housing; the merchandise is cooled by shifting the on-off temperature of the cooling mechanism to a level lower than a normal operation level for a predetermined pre-peak mode prior to a peak time zone of power demand under control of a timer as a peak shift operation; and the cooling mechanism is forced to stop for a predetermined time in the peak time zone as a peak cut operation, said method comprising the steps of:

providing two kinds of temperature sensors including a merchandise temperature sensor for immediately detecting the merchandizing temperature and an in-housing temperature sensor for detecting the air temperature within a merchandise housing; and controlling the cooling mechanism with the merchandise temperature sensor during the peak cut or peak shift operation and controlling the cooling mechanism with the in-housing temperature sensor during the normal operation.

2. A method of controlling the cooling of merchandise in a vending machine as claimed in claim 1, wherein the peak cut or peak shift operation is stopped to cause the normal operation to be restored when an inner door covering the front of the merchandise housing has been kept open for a predetermined time during the peak cut or peak shift operation.

3. A method of controlling the cooling of merchandise in a vending machine as claimed in claim 1, wherein the peak cut or peak shift operation is stopped to cause the normal operation to be restored when the number of articles of merchandise sold in any one of the columns has reached a predetermined value during the peak shift or peak cut operation.

4. A method of controlling the cooling of merchandise in a vending machine as claimed in claim 1, wherein the peak cut or peak shift operation is stopped to cause the normal operation to be restored when the number of articles of merchandise sold in the whole vending machine has reached a predetermined value during the peak cut or peak shift operation.

5. A method of controlling the cooling of merchandise in a vending machine as claimed in claim 1, wherein a lower-limit temperature is set to prevent merchandise from being frozen during the peak shift operation, so that the cooling mechanism is turned off when an in-housing air temperature has reached the lower-limit temperature during the peak shift operation.

6. A device for controlling the cooling of merchandise in a vending machine, comprising:

a housing for storing merchandise therein;

a cooling mechanism for cooling air with said housing;

a plurality of merchandise temperature sensors for detecting for directly detecting merchandise temperature, respectively;

a in-housing temperature sensor for detecting air temperature within said housing;

means for setting reference temperatures for normal operation and a peak shift operation, respectively; and control means for suspending the operation of said cooling mechanism during the peak cut operation to control said cooling mechanism according to said merchandise temperature sensors, said in-housing temperature sensor, and said reference temperatures;

wherein said control means controls said cooling mechanism through said merchandise temperature sensors during the peak cut operation and the peak shift operation, and controls said cooling mechanism through said in-housing temperature sensor during the normal operation.

7. A device for controlling the cooling of merchandise as claimed in claim 6, further comprising a counter for counting a period of time when a door of said housing is kept open during the peak cut or peak shift operation, wherein said control means stops the peak cut or peak shift operation to restore the operation to the normal operation when said period of time reaches a predetermined value.

8. A device for controlling the cooling of merchandise as claimed in claim 6, further comprising a counter for counting the number of articles of merchandise sold in each column in the bending machine during the peak cut or peak shift operation, wherein said control means stops the peak cut or peak shift operation to restore the operation to the normal operation when the count number reaches a predetermined value.

9. A device for controlling the cooling of merchandise as claimed in claim 6, further comprising a counter for counting the total number of articles of merchandise sold in the bending machine during the peak cut or peak shift operation, wherein said control means stops the peak cut or peak shift operation to restore the operation to the normal operation when the count total number reaches a predetermined value.

10. A device for controlling the cooling of merchandise as claimed in claim 6, wherein said setting means sets a lower-limit temperature to prevent merchandise from being frozen during the peak shift operation, so that said cooling mechanism is turned off when an in-housing air temperature has reached the lower-limit temperature during the peak shift operation.

* * * * *